Sept. 25, 1956 J. R. F. SERRATACO 2,764,633

COMBINED TELEGRAPH AND TELEPHONE SYSTEM

Filed Dec. 14, 1954 2 Sheets-Sheet 1

INVENTOR.

John R. Fernandez Serrataco

BY

McMorrow, Berman + Davidson

ATTORNEYS

INVENTOR.
John R. Fernandez Serrataco
BY
McMorrow, Berman & Davidson
ATTORNEYS

United States Patent Office 2,764,633

Patented Sept. 25, 1956

2,764,633

COMBINED TELEGRAPH AND TELEPHONE SYSTEM

John R. Fernandez Serrataco, Tallahassee, Fla.

Application December 14, 1954, Serial No. 475,101

4 Claims. (Cl. 179—4)

This invention relates to communication systems, and more particularly to a dial telephone system provided with means for at times adapting the system for telegraph operation.

The main object of the invention is to provide a novel and improved combined telephone and telegraph system wherein the calling subscriber may communicate with an unattended subscriber's set and leave a visual record of his message, the improved system being simple in construction, involving relatively few components, and being reliable in operation.

A further object of the invention is to provide an improved dial telephone system provided with means for at times adapting the system for telegraph operation, for example, after a predetermined ringing period at an unattended subscriber's set, whereby a calling subscriber may communicate with the unattended subscriber's set and leave a visual record of his message, the improved system involving inexpensive components, being automatic in operation to reset the unattended subscriber's set for normal operation after a predetermined period of time after it has been placed in condition for telegraph operation, and being arranged so that a conventional dial telephone set may be easily modified for telegraph operation, said telegraph operation utilizing the pulsing circuit of the dial telephone set to provide the telegraph signals.

A still further object of the invention is to provide an improved combined telegraph and telephone system adaptable for use with standard telephone equipment, said system being arranged so that a calling subscriber may leave a telegraphic message in the event that the station called is not answered by a person after a predetermined ringing period, the called station being automatically placed in operation by the ringing signals and being arranged to provide a predetermined period, sufficient to record a substantial message, during which the calling subscriber may transmit a message telegraphically employing the dial mechanism of his telephone set.

Further objects and advantages of the invention will become apparent from the following description and claims, and from the accompanying drawings, wherein:

Figure 1:
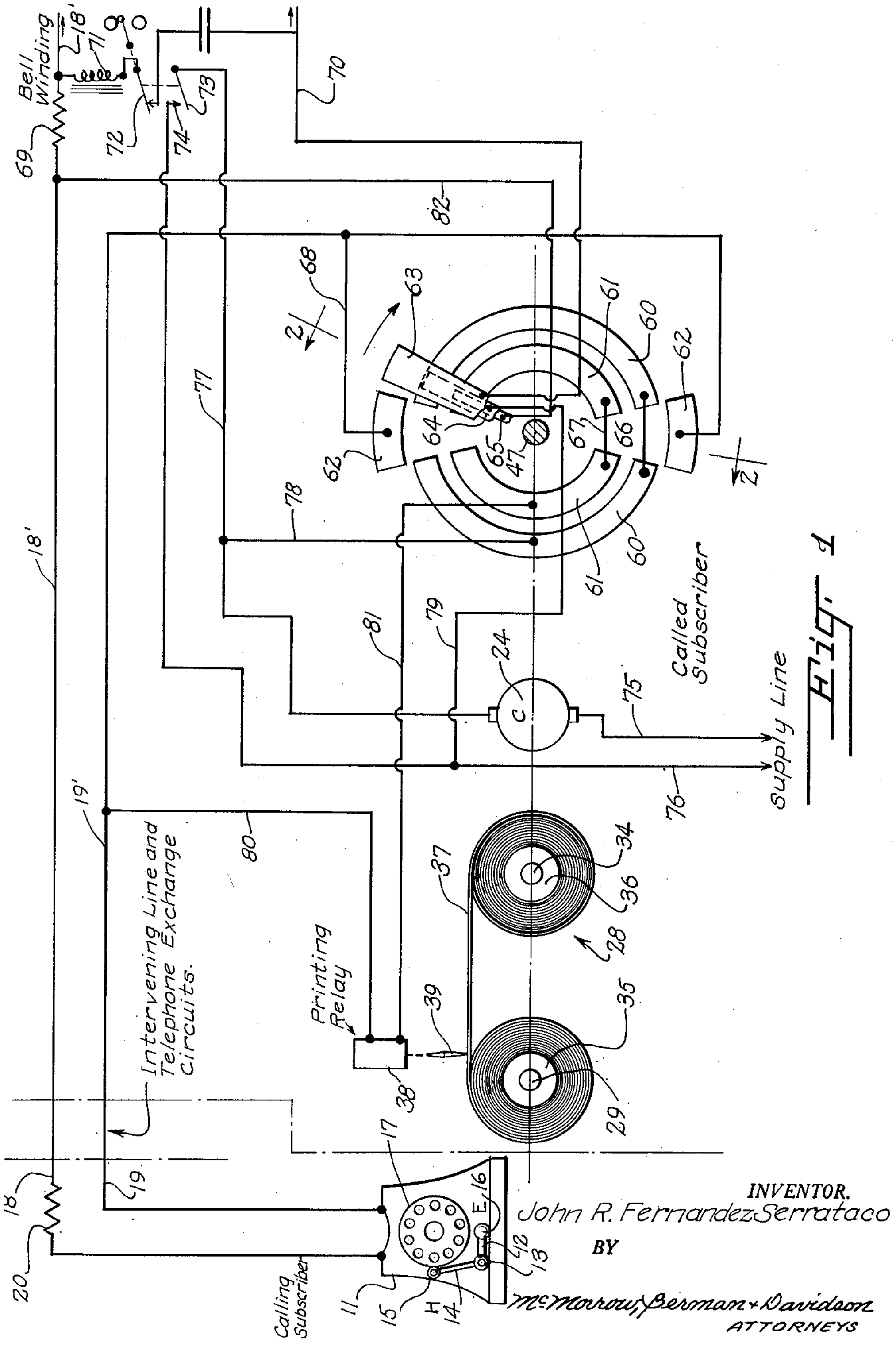
Figure 1 is a schematic diagram illustrating the electrical circuit of an improved combined dial telephone and telegraph system according to the present invention.
Figures 2, 3, 4, 5:
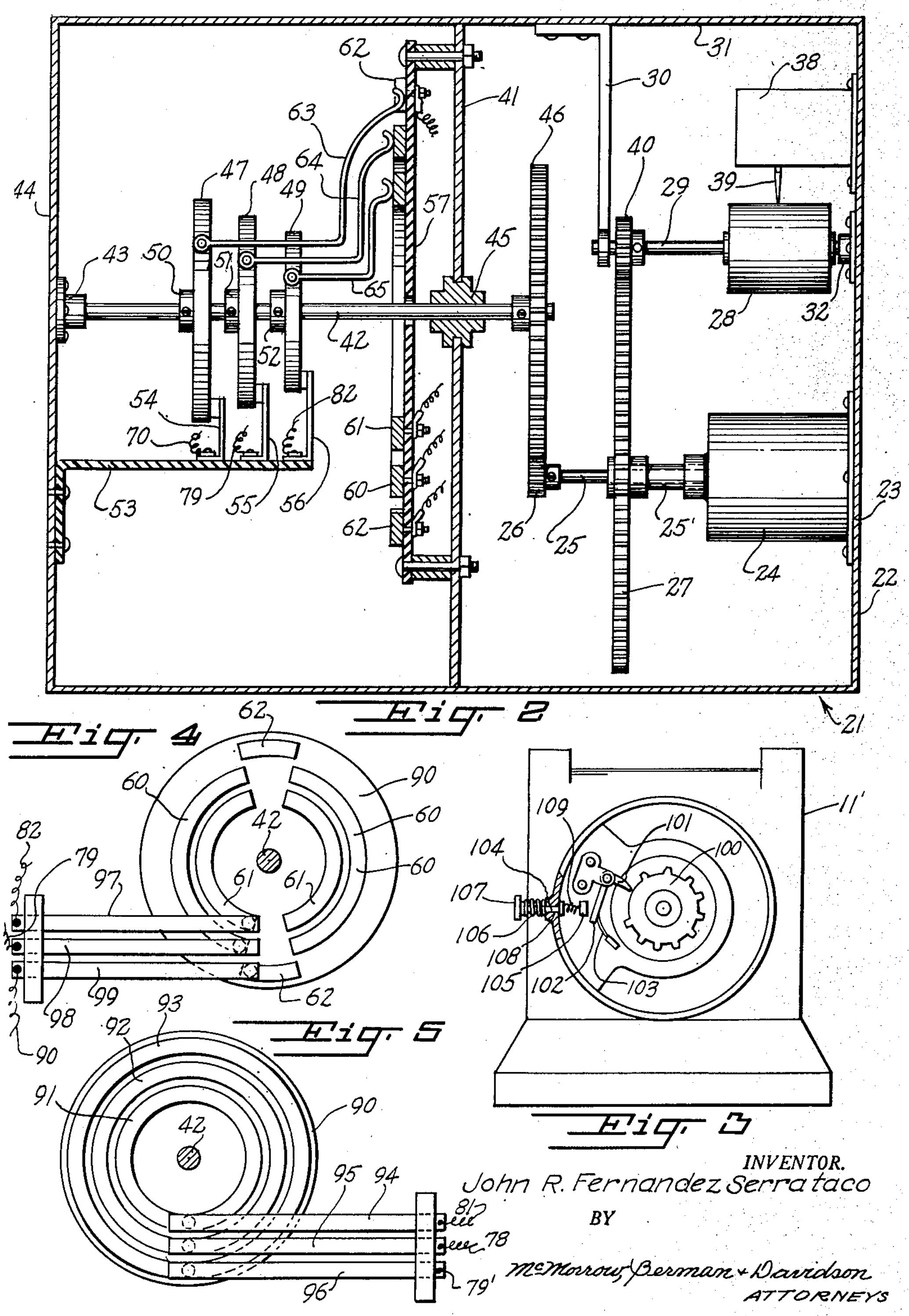
Figure 2 is a transverse vertical cross sectional view taken through the timing mechanism employed with a called subscriber telephone set of the present invention, said view being taken substantially on the line 2—2 of Figure 1.
Figure 3 is a front elevational view, partly in cross section, of a dial telephone set modified according to the present invention, and representing a different form than that employed in the system illustrated in Figure 1.
Figure 4 is a fragmentary transverse vertical cross sectional detail view taken through a timing unit according to the present invention, and illustrating a modified form thereof, particularly with respect to the rotating switch means employed therein.
Figure 5 is a transverse vertical cross sectional view of the rotating switch means of Figure 4, but taken from the opposite side thereof.

Referring to the drawings, and more particularly to Figures 1 and 2, 11 designates a dial telephone set which is substantially conventional in construction except that it is provided with a lever 12 pivoted to the housing of the telephone set at 13, said lever being provided with an arm 14 having a rubber roller 15 rotatably mounted on the end thereof. The lever 12 has the manual operating knob 16 by means of which the lever may at times be rotated clockwise, as viewed in Figure 1, to bring the rubber roller 15 into contact with the rotary element 17 of the telephone dial mechanism.

It will be understood that normally the dial mechanism is arranged to provide pulses at a rate determined by an escapement mechanism provided within the dial telephone set, so that after the dial has been manually moved to a designated position and released, the dial returns to its initial position at a predetermined rate of speed, providing pulses which are spaced in accordance with the aforesaid escapement mechanism. When the lever 12 is rotated, as above described, to bring the roller 15 into contact with the periphery of the rotary element 17, the return of the rotary element to its initial position is retarded, and the rate of pulsing of the dial mechanism may be thus slowed down, enabling a person to employ at least two different rates, one of said rates being the normal return rate of the rotary member 17, established by the normal escapement mechanism of the telephone set, and another rate which is slower than the normal rate and which is established by engaging the retarding roller 15 with the edge of the rotary element 17.

The telephone set 11 is connected to the usual telephone lines 18 and 19, a suitable resistor 20 being connected in the line 18, as shown.

It will be understood that each subscriber in the system is provided with a telephone set 11, and similarly, each subscriber is provided with means for receiving telegraphic communications employing the different dial pulsing rates, said means consisting, for example, of a timed switch unit, designated generally at 21 in Figure 2, the unit being contained, for example in a housing 22.

Mounted on an end wall 23 of the housing 22 is a timing motor 24 having the shaft portions 25 and 25' on which are respectively mounted a small gear 26 and a relatively large gear 27. Designated at 28 is a tape transport mechanism of conventional construction which is provided with the driving shaft 29 which is suitably journaled, as shown in Figure 2, one end of the shaft being journaled in a depending bracket 30 secured to the top wall 31 of the housing 22, and the other end of the shaft being journaled in a bearing bracket 32 secured to the end wall 23. The tape transport mechanism 28 comprises an additional shaft 34 which is suitably journaled parallel to the shaft 29. The shafts 29 and 34 carry the respective tape drums 35 and 36 on which are wound the respective coiled end portions of a recording tape, such as a paper tape 37, as shown schematically in Figure 1.

Mounted on the end wall 23 above the tape transport mechanism 28 is a printing relay 38 of conventional construction provided with the depending marking element 39, said marking element being arranged to engage the recording tape 37 in response to the reception of a pulse by the marking relay 38, whereby a series of pulses received by the marking relay 38 will provide a spaced series of marks on the tape 37, the spacing of the pulses being in accordance with the different rates of rotation of the rotary element 17 of the dial mechanism of a calling subscriber, as will be presently explained.

Mounted on the shaft 29 is a relatively small gear 40 which meshes with the relatively large gear 27, whereby the tape transport mechanism 28 is drivingly coupled to the shaft 25 of the timing motor 24, and thereby the shaft 29 is driven at a substantially greater speed than the shaft 25.

Rigidly secured in the housing 22 is a transversely extending supporting member, such as a partition plate, shown at 41, the plate 41 being parallel to the end wall 23 of housing 22, as shown in Figure 2.

Designated at 42 is a shaft which is arranged parallel to shaft 25 and which is journaled at one end in a bearing bracket 43 secured to the end wall 44 of housing 22. The opposite end portion of the shaft 42 is journaled in a bearing bushing 45 secured in the transverse wall 41, as shown in Figure 2. Secured to the end of the shaft 42 is a relatively large gear 46 which meshes with the gear 26, thus drivingly coupling shaft 42 to the motor shaft 25, whereby the shaft 42 is driven at a substantially smaller rate of speed than the rate of speed of shaft 25.

Designated respectively at 47, 48 and 49 are three metal discs which are mounted on respective elements 50, 51 and 52 of insulating material which are secured on the shaft 42 in spaced relationship, as shown in Figure 2. Secured to the end wall 44 of housing 22 is an insulating bracket 53 on which are mounted the respective contact members 54, 55 and 56 which respectively slidably engage the conductive discs 47, 48 and 49.

Designated at 57 is an insulating plate which is secured to the transverse member 41 parallel thereto, as shown in Figure 2, and which is provided with respective pairs of arcuate contacts 60, 60, 61, 61, and 62, 62 which are arranged in concentrically spaced relationship with respect to the shaft 42.

As shown in Figure 1, the arcuate contacts 62, 62 are arranged diametrically opposite each other with respect to shaft 42 and are relatively short in length. The arcuate pairs of contacts 60, 60 and 61, 61 are also diametrically arranged opposite each other and are located in the respective angles intervening between the short arcuate contacts 62, 62, as illustrated in Figure 1. Thus, the opposite arcuate contacts 62, 62 subtend relatively small opposite angles, whereas the opposite arcuate contacts 61, 61 and 60, 60 subtend relatively large opposite angles.

Secured to the periphery of the conductive disc 47 is a spring contact arm 63 which is shaped to engage the arcuate contacts 62, 62 and to make sliding conductive contact therewith as the disc 47 is rotated by the shaft 42. Similar spring arms 64 and 65 are secured to the peripheries of the respective discs 48 and 49 and are shaped to slidably and conductively engage the respective arcuate contacts 60 and 61.

The arcuate contacts 60, 60 are electrically connected together by a conductor 66, and similarly the arcuate contacts 61, 61 are electrically connected by a conductor 67. The arcuate contacts 62, 62 are electrically connected together, as shown in Figure 1, one of the incoming telephone line wires 19′ being connected to one of the arcuate contacts 62, and the other arcuate contact 62 being connected to the wire 19′ by a conductor 68.

As shown in Figure 1, the other incoming telephone line wire 18′ is connected to the receiving telephone set through a resistor 69, the receiving telephone set being also connected to a wire 70 which is in turn connected to the spring arm 63, through arm 54 and disc 47, as shown in Figure 2. Thus, the receiving telephone set is connected across the wires 18′ and 70, and also connected across said wires is the ringing circuit of the receiving telephone, comprising the bell winding 71 and the associated conventional bell armature 72. Mechanically linked to the bell armature 72 is another armature 73 which is adapted to conductively engage a contact 74 in response to the energization of the bell winding 71 but which is normally disengaged from said contact 74.

The timing motor 24 has one terminal thereof connected to one of the current supply lines 75. The other supply line 76 is connected to the contact 74. The remaining terminal of the motor 24 is connected to the armature 73 by a wire 77. Thus, the motor 24 is arranged to be intermittently energized in response to the intermittent energization of the bell winding 71 when the ringing signal is transmitted to the lines 18′, 19′ in the usual manner.

The arcuate contacts 60, 60 are connected to the wire 77 by a wire 78. The spring contact arm 64 is connected to the line wire 76 through disc 48 and arm 55, by a wire 79. Thus, the motor 24 will be energized when the spring arm 64 engages one of the contacts 60, 60, by a circuit comprising line wire 76, wire 79 arm 55, disc 48, spring contact arm 64, the contacts 60, 60, the wire 78, the wire 77, the winding of the motor 24, and the line wire 75. Prior to this, however, the motor 24 may also be intermittently energized by a circuit comprising the line wire 76, the contact 74, the armature 73, the wire 77, the motor winding, and the line wire 75, such energization being in response to the intermittent energization of the bell winding 71, as above explained.

One terminal of the printing relay 38 is connected to the wire 19′ by a wire 80. The other terminal of the printing relay 38 is connected by a wire 81 to one of the arcuate contacts 61, 61. The contact arm 65 is connected to the wire 18′ through disc 49 and arm 56 by a wire 82. Thus, the printing relay 38 is connected to the telephone receiving line wires 18′ and 19′ when the spring arm 65 engages one of the arcuate contacts 61 by a circuit comprising wire 80, the winding of the printing relay 38, wire 81, the arcuate contact 61, the spring contact arm 65, disc 49, arm 56 and the wire 82. When the printing relay 38 is thus connected to the receiving line wires 18′ and 19′, the printing relay may be actuated by pulses transmitted by the calling subscriber in the manner above described. The motor 24 also drives the tape transport mechanism 28, causing the tape to be moved below the marking element 39 at a constant rate of speed, whereby different pulse rates will provide different spacings between the markings made on the tape 37 by the marking element 39, enabling the calling subscriber to transmit a suitably coded message which will be recorded on the tape 37.

In operation of the system of Figure 1, when the ringing signal is transmitted to the receiving line wires 18′ and 19′ of a called subscriber, the bell winding 71 becomes intermittently energized. This intermittently energizes the timing motor 24, and if the ringing continues for a predetermined period of time, sufficient to move the contact arm 64 into engagement with one of the arcuate contacts 60, the timing motor 24 thereafter becomes energized by a circuit comprising the line wire 76, the wire 79, contact arm 64, the arcuate contacts 60, the wire 78, the wire 77, the winding of the motor 24 and the line wire 75. At the same time, the spring arm 63 disengages from the arcuate contact 62 with which it was initially in contact, opening the bell-ringing circuit, since the wire 70 is thus disconnected from the arcuate contact 62 with which it was previously electrically connected by the arm 63. The ringing period, namely, the period during which the contact arm 63 remains in contact with the arcuate contact 62, may be any suitable time interval, for example a period of two minutes, to allow the subscriber, if present, to pick up the telephone. However, at the end of the selected time period, for example, two minutes, ringing is terminated and the motor 24 becomes energized by the aforesaid circuit which remains effective for a further predetermined time, which may be of substantial duration, during which the calling subscriber may transmit a telegraph message by means of his dial mechanism and the pulse rate-selecting means above described. For example, the timing motor 24 may remain energized for a period of the order of one-half hour, during which telegraph messages may be transmitted by the calling subscriber. At the end of this period, the contact arms 64 and 65 disengage from their respective associated arcuate contacts 60 and 61 and the spring contact arm 63 engages with the next arcuate contact 62, deenergizing the timing motor 24 and resetting the system for a repetition of the above described cycle of operation when the bell winding 71 is again energized by the transmission of a ringing signal to the telephone receiving line wires 18' and 19'.

The telegraph message may be transmitted by the use of a suitable code, for example, by employing the Morse code, wherein pulses having the normal spacings, namely, pulses produced by the free return of the rotary member 17 on the dial telephone of the calling subscriber, represent "dots," and the spacings between the pulses produced when the member 17 is retarded, by the operation of the lever 12, as above described, represent "dashes."

In the modified form of rotary switch device illustrated in Figures 4 and 5, the arcuate contact members 60, 61 and 62 are mounted on a rotary insulating disc 90 which is secured on the shaft 42 for rotation therewith. On the opposite surface of the disc 90 are secured respective concentric slip rings 91, 92 and 93 which are electrically connected respectively with the arcuate contacts 61, 61, the arcuate contacts 60, 60, and the arcuate contacts 62, 62. The slip rings 91, 92 and 93 are engaged by respective contact brushes 94, 95 and 96 connected respectively to the wires 81, 78 and 19'. Similar stationary contact brushes 97, 98 and 99 are provided and are positioned to be respectively engageable with the arcuate contacts 61, 61, the arcuate contacts 60, 60 and the arcuate contacts 62, 62, as is clearly shown in Figure 4. The wire 82 is connected to the contact brush 97, the wire 79 is connected to the contact brush 98 and the wire 70 is connected to the contact brush 99, whereby the same switching functions are obtained as are obtained in the apparatus illustrated in Figures 1 and 2.

Referring now to Figure 3, a further arrangement for selecting the pulsing rate at the calling subscriber's dial telephone is illustrated, the telephone being designated generally at 11'. The telephone set 11' includes the conventional escapement means for providing a predetermined pulsing rate as the rotary member of the dial mechanism is released, said escapement means including for example the toothed wheel 100 and the pivoted escapement pawl 101. The pawl 101 has a depending arm 102 which engages against a leaf spring 103. As is well understood, in using the dial, the rotary member, to which the toothed member 10 is rigidly coupled, is first rotated clockwise, as viewed in Figure 3, and is then released, whereupon the toothed member 100 intermittently engages the pawl 101 as it returns to its initial position, providing a series of pulses which are spaced apart by a substantially constant amount.

Designated at 104 is a plunger member which is slidably mounted on the telephone set 11' laterally adjacent to the arm 102, said plunger extending inwardly and having a head portion 105 secured thereto by a coiled spring 109, whereby said head portion may be engaged with the arm 102 when the plunger is pushed inwardly, namely, to the right, as viewed in Figure 3. A coiled spring 106 surrounds the exterior portion of the plunger and bears between the head 107 of said plunger and an abutment boss 108 on the body of the telephone set, biasing the plunger 104 to the left, to a position wherein the arm 102 is free to oscillate for normal escapement operation. However, by pushing the plunger 104 inwardly, namely, to the right, as viewed in Figure 3, the arm 102 is resiliently engaged by the head portion 105 against the force of leaf spring 103, damping the normal rotation of the pawl 101, whereby the toothed member will return to its normal position more slowly than under normal conditions, providing a slower pulsing rate. Thus, to send dots, the calling subscriber may employ the normal return rate of the rotary member 100 of his dial set, and to send dashes, the calling subscriber presses the plunger head 107 to force the plunger inwardly, creating more resistance to the rotation of the pawl member 101, and thus providing the slower pulse rate.

It will be readily apparent that a calling subscriber may thus leave a telegraph message in the event that there is no one present to answer the telephone at the residence of the called subscriber, and that the called subscriber will have a visible record of the message when he returns to his residence, said message being coded so that it may be readily translated.

As the main thought of the present invention is the use of telegraphic registers in combination with a telephone dial sending electric pulses in communications by wire, the system above described can be used not only for sending messages to unattended telephone stations but, in simple direct circuits also, to send telegraphic communications or similar electric signals, as performed by teletype systems.

While certain specific embodiments of an improved combined telephone and telegraph system have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a dial telephone system, a line, a calling set connected to said line and having a dial and a circuit controlled thereby arranged to normally apply pulses to said line at a predetermined rate, a receiving set connected to said line, said receiving set including a bell relay, a timing motor at the receiving set, a tape transport mechanism drivingly coupled to said motor, a tape on said transport mechanism, a marking relay, a marking element actuated by said marking relay and being engageable with said tape, a source of current at the receiving set, means intermittently connecting said timing motor to said source responsive to the energization of said bell relay and continuously connecting said timing motor to said source, and means terminating energization of said bell relay after a first predetermined time period and connecting said marking relay to said line and said dial circuit for a second predetermined time period, and means on said calling set for manually changing the rate at which said pulses are applied to said line, whereby said marking element will engage said tape at different rates in accordance with the different rates of said pulses.

2. In a dial telephone system, a line, a calling set connected to said line and having a dial and a circuit controlled thereby arranged to normally apply pulses to said line at a predetermined rate, a receiving set connected to said line, said receiving set including a bell relay normally connected to said line, a timing motor at the receiving set, a tape transport mechanism drivingly coupled to said motor, a tape on said transport mechanism, a marking relay, a marking element actuated by said marking relay and being engageable with said tape, a source of current at the receiving set, means intermittently connecting said timing motor to said source responsive to the energization of said bell relay, and means disconnecting said bell relay from said line and continuously connecting said timing motor to said source after a first predetermined time period and connecting said marking relay to said line and said dial circuit for a second predetermined time period, means on said calling set for manually changing the rate at which said pulses are applied to said line, whereby said marking element will engage said tape at different rates in accordance with the different rates of said pulses, and means disconnecting said timing motor from said source, disconnecting said marking relay from said line, and reconnecting said bell relay to said line at the end of said second time period.

3. In a dial telephone system, a line, a calling set connected to said line and having a dial and a circuit controlled thereby arranged to normally apply pulses to said line at a predetermined rate, a receiving set connected to said line, said receiving set including a bell relay, a timing motor at the receiving set, pulse recording means at the receiving set controlled by said timing motor, a source of current at the receiving set, means intermittently connecting said timing motor to said source responsive to the energization of said bell relay, and means terminating energization of said bell relay and continuously connecting the timing motor to said source after a first predetermined time period and connecting said pulse recording means to said line and said dial circuit for a second predetermined time period, and means on said calling set for manually changing the rate at which said pulses are applied to said line, whereby said pulse recording means will receive pulses in accordance with the different rates.

4. In a dial telephone system, a line, a calling set connected to said line and having a dial and a circuit controlled thereby arranged to normally apply pulses to said line at a predetermined rate, a receiving set connected to said line, said receiving set including a bell relay, a timing motor at the receiving set, rotary switch means mechanically coupled to said timing motor, pulse recording means at the receiving set controlled by said timing motor, a source of current at the receiving set, means formed and arranged to intermittently connect said timing motor to said source responsive to the energization of said bell relay, said rotary switch means being formed and arranged to terminate energization of said bell relay and to continuously connect said timing motor to said source after a predetermined period of intermittent operation of said timing motor and to simultaneously connect said pulse recording means to said line, and means on said calling set for manually changing the rate at which said pulses are applied to said line, whereby said pulse recording means will receive pulses in accordance with the different rates.

References Cited in the file of this patent

UNITED STATES PATENTS

| | | |
|---|---|---|
| 1,887,588 | Elkins | Nov. 15, 1932 |
| 2,222,751 | Michaelson | Nov. 26, 1940 |
| 2,673,241 | Van Deventer | Mar. 23, 1954 |